United States Patent Office 2,859,349
Patented Nov. 4, 1958

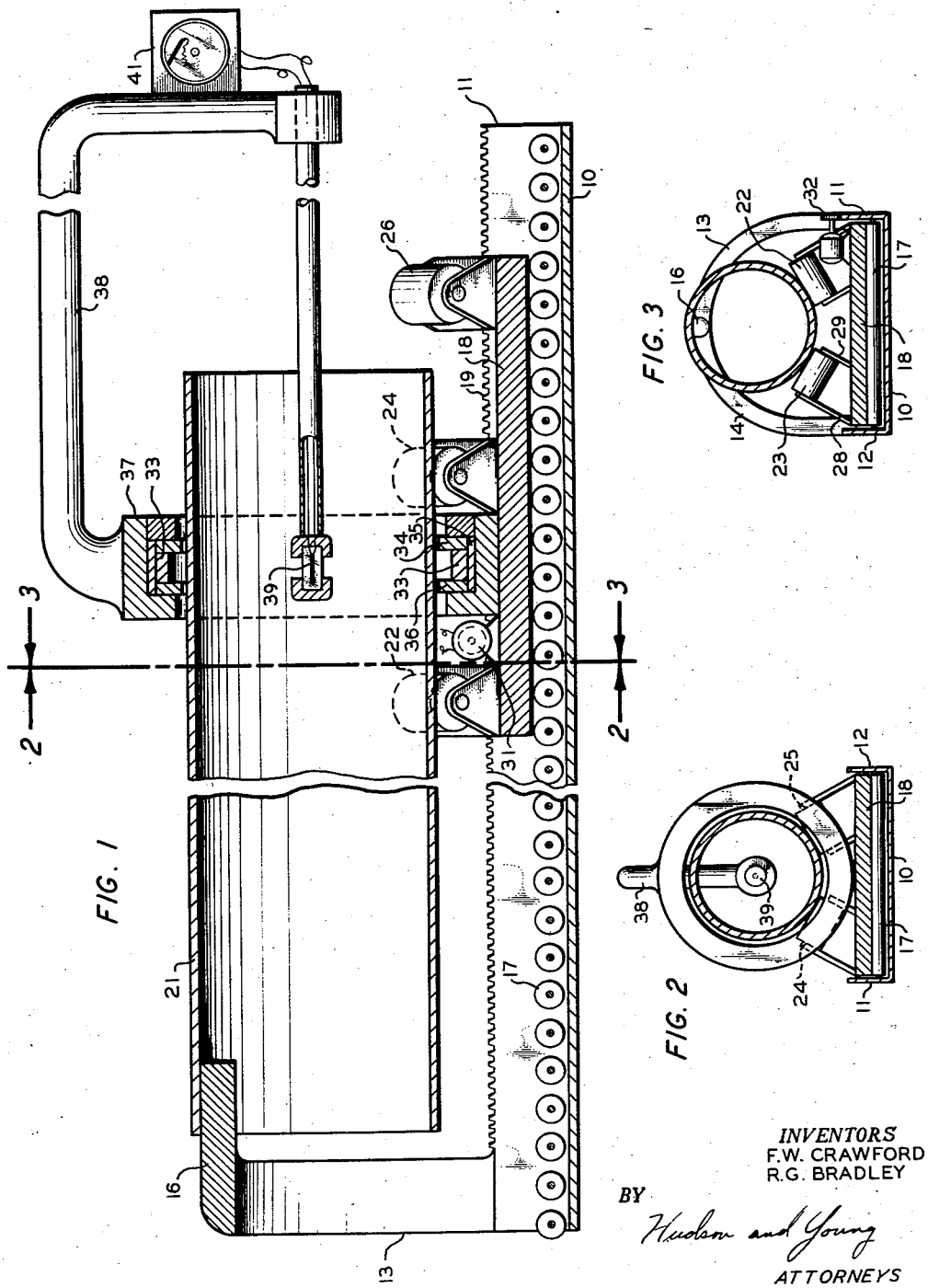

2,859,349
RADIOLOGICAL EXAMINATION OF HOLLOW ARTICLES

Russell G. Bradley and Francis W. Crawford, Bartlesville, Okla., assignors to Phillips Petroleum Company, a corporation of Delaware Application August 1, 1955, Serial No. 525,521

3 Claims. (Cl. 250—53)

This invention relates to radiological examination of hollow articles. In a further aspect this invention relates to means for and a method of determining internal characteristics of hollow articles by measuring the amount of radiant energy absorbed thereby when a source of energy is placed around the article and the energy therefrom is measured within the article, changes in the amount of radiation adsorbed indicating changes in the characteristics of the article.

Radiological examination of hollow articles, such as pipes, tubes, etc., formed of different thicknesses of paper, plastic, rubber, textile fabrics, metals, etc. has been practiced for some time. The usual method utilized in such an examination has been carried out by using a wire or line source of radiation on the axis of the article and a detecting medium, such as a photo-sensitive film, Geiger tube, ionization chamber, scintillation device, etc. outside of the article. A disadvantage of such a system is that detection around the surface is difficult. If a plurality of detectors are used the results are not uniform since they vary in sensitivity. If only one is used, there is no possibility of getting the complete picture of the article at each instant.

We have discovered that such examination can advantageously be made by placing a line or tape source of radiation around the article and the detector along the axis. This requires only one detector and a line source of radiant energy.

The following are objects of this invention.

An object of this invention is to provide an improved method of and apparatus for radiological examination of hollow articles. A further object of this invention is to provide apparatus for the examination of hollow cylinders whereby a continuous examination of a section of considerable length can be automatically and continuously made.

Other objects and advantages of this invention will be apparent to one skilled in the art upon reading this disclosure. Accompanying and forming a part of this disclosure is a drawing comprising:

Figure 1, a view of a preferred modification of apparatus suitable for practicing this invention, this view being partly in section, Figure 2, a cross section on line 2—2 of Figure 1, and Figure 3, a cross section view on line 3—3 of Figure 1.

We believe that this invention will find its greatest use in the examination of hollow articles of cylindrical shape and, therefore, cylinders will be referred to in the balance of the specification, it being, of course, obvious that the general disclosure is applicable to hollow articles of other shapes. Broadly stated, in this invention, a linear or tape source of radiation is placed uniformly around the outside of the cylinder and concentric with the cross section of the cylinder and a detector on the axis of the cylinder. By this arrangement, it is of advantage to employ a wire or ribbon which is uniformly radioactive as a source of radiation and a scintillation crystal as the detector. The radiation source and detector are placed in the same plane perpendicular to the axis of the cylinder being examined. Preferably, a collimating shield is used to confine the inspected volume of the cylinder wall to the desired dimension limited only by the sensitivity of the detector and the strength of the radiant energy source.

In Figure 1, preferred apparatus for carrying out the method of this invention is shown. This apparatus comprises a stationary supporting base 10 of a generally U-shape having walls 11 and 12. At one end of this frame a support member is provided, this comprising arms 13 and 14 and a forward projecting support bar 16. In the bed of the supporting base there are provided a plurality of roller bearings 17 upon which a platform 18 rides. On wall 11 gear teeth are provided forming a rack 19. A series of roller bearings are mounted upon platform 18 in order to support a cylinder 21. The length of the platform 18 and the number of roller bearings is such that the cylinder 21 is adequately supported during the examination thereof. In the drawing, three pairs of roller bearings are shown, these being, in Figure 1, bearings 22, 24, and 26, bearings 24 and 25 being shown in Figure 2 and bearings 22 and 23 being shown in Figure 3, each of these roller bearings being suitably supported as by support members 28 and 29 shown in Figure 3. Also mounted on platform 18 is a motor 31, this motor being connected to pinion 32, this pinion riding in rack 19. The platform also carries the circular or tape source of radiant energy 33, this being mounted in shield means comprising elements 34, 35, 36, and 37. Extended from shield member 37 is a support arm 38, arm 38 being generally U-shaped and extending around the end of a cylinder being examined and into a point substantially on the axis of the source of radiant energy 33. Mounted upon the end of support arm 38 is a scintillation or other radiation detector 39. Connected to detector 39 is indicating means 41, shown in Figure 1 as a continuous recorder. It will be obvious to one skilled in the art that scintillation detector 39 could also be connected to warning devices of various types, control mechanisms, and/or indexing mechanisms.

In operation, the article to be tested is placed in the apparatus, resting upon support member 16 and the forward roller bearings 22 and 23. Upon starting motor 31, platform 18, driven by rack and pinion 19 and 32, moves lengthwise of the cylinder. The radiant energy source 33 consequently moves lengthwise of the cylinder and a certain amount of the radiant energy is absorbed thereby. Energy not absorbed is detected by detector 39. The response of the detector can be recorded continuously or point by point as is necessary in examining any particular article. As long as a constant reading is obtained, it will be known that the characteristics of the walls of the cylinder are constant. Imperfections in these walls, such as a void space therein or changes in the thickness thereof, would be apparent when the amount of energy absorbed is changed.

This invention is, of course, applicable to cylinders containing hollow walls as well as those containing solid walls. Furthermore, a hollow wall cylinder might be filled with a different material within said walls.

Our invention is not limited to any particular type of radiation source, the choices of the type of radiation used being well known in the art. Thus, it is known that alpha particles have very short range, up to 2 inches in air or approximately 0.003 inch of paper, and consequently could only be used to measure the thinnest foils. Of greater penetrating force are beta particles and positrons which have a range up to approximately 0.05 inch of paper. Neutrons, being uncharged, have a much longer range and protons and deuterons have a range intermediate alpha and beta particles. X-rays and gamma rays are of considerably greater penetrating power and would be the choice for examination of cylinders of considerable thickness and/or are made from materials of high absorption capacity. While directed sources of cosmic rays, including meson rays, are not commercially available, there is no reason to believe that such rays would not be suitable for use in this invention at a time when such rays are better understood.

As many possible embodiments may be made of this invention without departing from the scope thereof, it is to be understood that all matter herein set forth is to be interpreted as illustrative and not as unduly limiting the invention.

We claim:

1. Apparatus for determining the characteristics of a hollow cylinder comprising a detector of radiant energy; indicating means connected to said detector; a uniform, annular source of radiant energy completely surrounding said detector, said detector and said source being spaced so that a hollow cylinder passing therebetween will surround said detector and be within said source; and means to provide relative movement of said hollow cylinder and said source perpendicular to the plane of said source and said detector.

2. Apparatus for determining the characteristics of the walls of a hollow article comprising a supporting base, means to support one end of a hollow article when positioned longitudinally of said supporting base, a platform movably mounted on said supporting base, means mounted on said platform adapted to support the hollow article to be examined, means to move said platform longitudinally of said supporting base, a substantially annular member mounted on said platform, a substantially U-shaped support arm with a first end connected to said annular member, and a second end terminating within said annulus on the axis thereof, a uniform, annular source of radiant energy supported by said annular member and a detector therefor supported by said second end of said U-shaped member, said detector and source being arranged to determine changes in radiation absorption of the article being examined, and indicating means connected to said detector.

3. Apparatus for determining the characteristics of the walls of a hollow article comprising, a U-shaped stationary supporting base having teeth on upstanding wall thereof forming a rack, a support member positioned at one end of said supporting base to support one end of a hollow article when positioned longitudinally of said supporting base, a plurality of roller bearings positioned transversely of said supporting base, a platform movably mounted on said roller bearings, roller bearings mounted on said platform adapted to support the hollow article to be examined, a motor mounted on said platform, a pinion connected to said motor adapted to engage said rack and thereby drive said platform longitudinally of said supporting frame, an annular shield having a cavity within the inner surfaces thereof mounted on said platform, an annular source of radiant energy positioned within said cavity in said annular shield, a support arm connected to said annular shield, a detector positioned at the center of said annular source of radiant energy mounted upon the end of said support arm, and indicating means connected to said detector.

References Cited in the file of this patent

UNITED STATES PATENTS

| | | |
|---|---|---|
| 1,648,746 | Stein | Nov. 8, 1927 |
| 1,806,375 | Tiedeman | May 19, 1931 |
| 2,277,756 | Hare | Mar. 31, 1942 |
| 2,412,174 | Rhoades | Dec. 3, 1946 |
| 2,433,718 | Teplitz | Dec. 30, 1947 |
| 2,607,012 | Siebert | Aug. 12, 1952 |
| 2,702,864 | McKee | Feb. 22, 1955 |
| 2,723,350 | Clapp | Nov. 8, 1955 |